(No Model.)
C. H. TALLMAN.
OIL CAN.
No. 285,705. Patented Sept. 25, 1883.
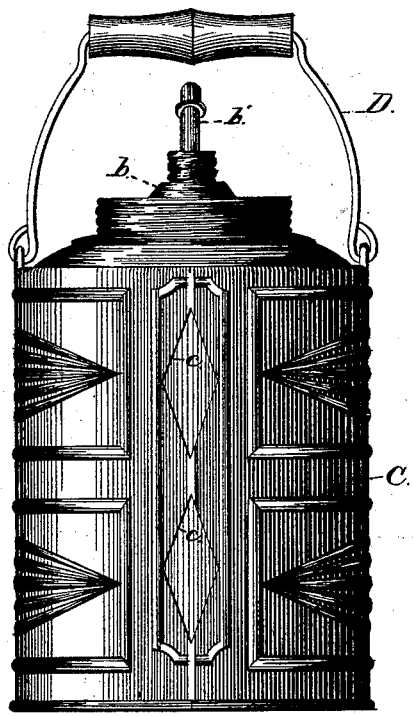
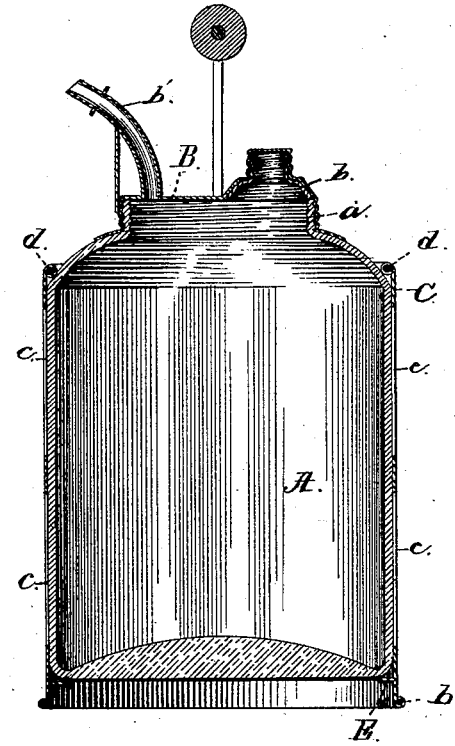
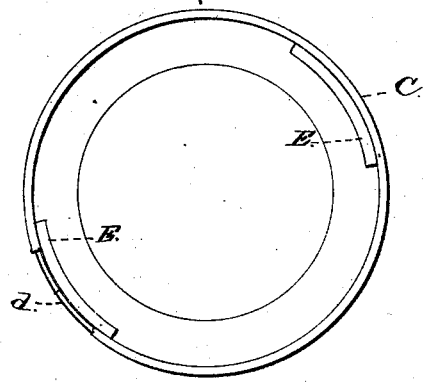
Witnesses.
N. A. Clark
E. M. Fowler
Inventor.
Charles H. Tallman
by Geo. W. Dyer
Att'y

UNITED STATES PATENT OFFICE.

CHARLES H. TALLMAN, OF BELLAIRE, OHIO.

OIL-CAN.

SPECIFICATION forming part of Letters Patent No. 285,705, dated September 25, 1883.

Application filed August 8, 1883. (No model.)

*To all whom it may concern:*

Be it known that I, CHAS. H. TALLMAN, of Bellaire, in the county of Belmont and State of Ohio, have invented a new and useful Improvement in Oil-Cans; and I do hereby declare that the following is a full and exact description of the same, reference being had to the accompanying drawings, and to the letters of reference marked thereon.

My invention relates to incased cylindrical glass oil-cans, and has for its purpose a greater economy of first cost, with an increased durability in use. The novelty therein consists in the particular construction and arrangement of the metallic casing for the glass vessel, and the means by which said casing serves to protect the glass vessel and support it within the metallic casing, as more particularly hereinafter described and claimed.

For the better understanding of my invention, reference should be made to the accompanying drawings, in which—

Figure 1 is an elevation of my can; Fig. 2, a vertical central section of the same, and Fig. 3 a bottom view of the same.

Similar letters denote corresponding parts in each figure.

In the drawings, A represents the glass vessel, and $a$ its neck, which is preferably screw-threaded upon the outside. Upon this neck the top B, the interior of which is preferably screw-threaded, is fastened securely with cement in the ordinary way. In this top are placed the filling-tube $b$ and the nozzle $b'$, of a construction well known in the trade.

The shell or metal case C of the can is made of a single piece of sheet metal, which extends from the top of the glass vessel to a distance below its bottom. The meeting or slightly-overlapping edges of this piece of sheet metal are soldered, and are preferably cut out so as to leave lozenge-shaped openings $c$ on one side of the can, and similar lozenge-shaped openings may be cut out of the metal on the opposite sides. As these openings are only for inspection of the contents of the can, they may be placed in the shell whenever it is most convenient, and be of a variety of size and forms and differ in number and locality. I have shown the same in the form and location I prefer on account of economy in construction. The top of the shell C is either drawn in a little, so as to be of less diameter than the top of the glass vessel, and is strengthened by a wire, $d$, to which the bail D is attached, or the top of the shell C has its strengthening-wire placed on the inside of the jacket, so that the inner diameter of the wire shall be less than the exterior diameter of the top of the glass vessel, and the bottom of the jacket is strengthened by a similar wire, $d'$, which serves to give firmness to the bottom of the shell and make a suitable foot for it to stand upon. The glass vessel is supported within the shell by a flange or wire, E, or equivalent means, soldered or secured to the inner wall of the shell, and extending partially or entirely around the same at a sufficient distance above its bottom to protect the bottom of the glass vessel from injury.

In the construction of this incased glass oil-can I take a single piece of sheet metal—preferably tin—of the proper size, and, cutting out the openings before named for inspection, fit the same around the glass vessel to be incased, and then put on a strengthening-wire at the part designed as the top, and on the inside of such part, or draw in the top a little and wire it on the outside, (the former method being preferred,) and then solder together the slightly-overlapping edges of the shell and insert the glass vessel up into such shell from the bottom, the drawn-in top, or the top with the inner strengthening-wire, overlapping a little the upper shoulder of the glass vessel and preventing any upward movement of the same. I then insert the strengthening-wire at the bottom, which wire should preferably have its ends at a distance from the meeting edges of the shell, for the purposes of greater strength, and preferably has the sheet metal rolled outwardly over it, and afterward solder in the flange or wire on the inside of the shell, which flange or wire holds the glass vessel securely in position above the bottom of the shell.

In the incased oil-can thus described I have great simplicity of structure, saving expense in labor, and great efficiency in use, all the parts being strong and durable.

While I have described my improvements as connected with oil-cans, it is evident that without substantial change they are adapted for holding a variety of liquids.

What I claim as new and of my own invention is—

1. An incased glass oil-can with only its walls covered with a shell composed of a single piece of sheet metal extending below the bottom of the glass vessel to serve as a foot-support for the same, and having a flange or wire secured to the inner wall of the shell above its bottom to hold the bottom of the glass vessel, substantially as described.

2. An incased oil-can wherein the incasing-shell of a cylindrical glass vessel has a wired top projecting over and onto the top shoulders of the glass vessel, and has a flange or wire secured to the inner wall of said shell above the bottom thereof, whereby the glass vessel is held in position in and above the bottom of the shell, and the shell serves as a foot for the incased vessel to stand upon, substantially as described.

In testimony whereof I affix my signature in presence of two witnesses.

CHARLES H. TALLMAN.

Witnesses:
GEORGE M. WOODBRIDGE,
HENRY MASER.